United States Patent [19]

Pappas

[11] Patent Number: 4,800,566
[45] Date of Patent: Jan. 24, 1989

[54] FUSION PUMPED LASER

[75] Inventor: Daniel S. Pappas, Los Alamos, N. Mex.

[73] Assignee: The United States of America as represented by the United States Department of Energy, Washington, D.C.

[21] Appl. No.: 79,961

[22] Filed: Jul. 31, 1987

[51] Int. Cl.$^4$ ............................ H01S 3/09; G21B 1/00
[52] U.S. Cl. ......................................... 372/73; 372/69; 376/146; 376/147; 376/326
[58] Field of Search .................................. 372/69–73; 376/326, 146, 147

[56] References Cited

U.S. PATENT DOCUMENTS

| | | | |
|---|---|---|---|
| 4,091,336 | 5/1978 | Miley et al. | 94.5 P/94.5 G |
| 4,160,956 | 7/1979 | Fader | 331/176 |
| 4,398,294 | 8/1983 | Miller et al. | 70/73 |

OTHER PUBLICATIONS

F. P. Boody et al., "Progress in Nuclear-Pumped Lasers," *Radiation Energy Conversion in Space*, (AIAA, New York, 1978).
G. H. Miley, "Direct Nuclear Pumped Lasers–Status and Potential Applications," Proceeding of the Fourth Workshop on Laser Interaction and Related Plasma Phenomena, 4A, 181–220 (Editors Schwarz, Hora; 1977), pp. 181, 182, 185, 214–220.
G. H. Miley, "Direct Pumping of Lasers by Fusion Reactors," *Fusion Reactor Engineering-II*, pp. 633–634.
D. L. Jassby, "Feasibility of Laser Pumping With Neutron Fluxes From Present-Day Large Tokamaks," PPPL-2377, pp. 1–12.
D. L. Jassby, "$^3$He Functions in Tokamak-Pumped Laser Systems," PPPL-2387, pp. 1–20 (Oct. 1986).
M. Greenwald et al., "Energy Confinement of High--Density Pellet-Fueled Plasmas in the Alcator C Tokamak," Phys. Rev. Lett. 53, No. 4, 352–355 (Jul. 23, 1984).

*Primary Examiner*—William L. Sikes
*Assistant Examiner*—Georgia Y. Epps
*Attorney, Agent, or Firm*—Ray G. Wilson; Paul D. Gaetjens; Judson R. Hightower

[57] ABSTRACT

Apparatus is provided for generating energy in the form of laser radiation. A tokamak fusion reactor is provided for generating a long, or continuous, pulse of high-energy neutrons. The tokamak design provides a temperature and a magnetic field which is effective to generate a neutron flux of at least $10^{15}$ neutrons/cm$^2$.s. A conversion medium receives neutrons from the tokamak and converts the high-energy neutrons to an energy source with an intensity and an energy effective to excite a preselected lasing medium. The energy source typically comprises fission fragments, alpha particles, and radiation from a fission event. A lasing medium is provided which is responsive to the energy source to generate a population inversion which is effective to support laser oscillations for generating output radiation.

4 Claims, 1 Drawing Sheet

4,800,566

FUSION PUMPED LASER

BACKGROUND OF THE INVENTION

This invention relates to neutron pumped lasers and, more particularly, to neutron pumped lasers having a fusion reactor as a source of high-energy neutrons. This invention is the result of a contract with the Department of Energy (Contract No. W-7405-ENG-36).

It is known to pump laser media using neutrons produced by a fission reaction. The neutrons interact with an intermediate material to produce energetic particles which thereafter excite a laser media to obtain a population inversion which produces a laser output. By way of example the following U.S. patents, incorporated herein by reference, teach various fission pumped lasers:

1. Walter J. Fader, "Nuclear-Pumped Uranyl Salt Laser," U.S. Pat. No. 4,160,956, dated July 10, 1979, provides a $UO_2^{++}$ uranyl salt laser medium enriched with a $^{235}U$ fission source. Fission products are produced within the uranyl salt to interact with the $UO_2^{++}$ ion to produce a lasing output from the uranyl salt.

2. George H. Miley et al., "Direct Nuclear Pumped Laser," U.S. Pat. No. 4,091,336, dated May 23, 1978, provides a neutron source, which is taught to be a nuclear reactor, to irradiate a cylinder coated with $^{235}U$ or $^{10}B$ and containing a laser medium of Ne-$N_2$. "A quasi steady-state" laser is taught, although no definition is provided for the term "quasi steady-state" other than in relation to the laser output.

3. Thomas G. Miller et al., "High Power Nuclear Photon Pumper Laser," U.S. Pat. No. 4,398,294, dated Aug. 9, 1983, provides a pulsed nuclear reactor for exciting Xe to generate photons which are effective to excite a laser medium of Ar, $SF_6$, and $XeF_2$.

The prior art fission neutron sources are taught as pulsed neutron sources. Such sources are not suitable for applications which require a continuous power source, e.g., laser communications. Also, fission reactors can not provide very high pulse repetition rates. Thus, fission neutron sources provide very little flexibility in application for the laser system.

Further, fission neutrons have relatively low energies, i.e., 1-2 MeV, and are further moderated by material between the fission source and the lasing media. Only a limited penetration is provided by the mean free path for these relatively low-energy neutrons. Fission neutron sources are suitable only for small volume lasers, with resulting relatively low-energy outputs. Moderator materials inherent in fission neutron sources thus provide inefficient neutron sources. Fission sources also generate quantities of high-level radioactivity with concomitant safety and environmental concerns.

There have been some suggestions for use of a fusion reaction to excite a laser medium. In George H. Miley et al., "Direct Pumping Of Lasers By Fusion Reactors," *Fusion Reactor Engineering-II*, p. 633, Miley et al. teach that a charged particle beam might be extracted from a fusion reactor for use with a chemical laser. Frederick P. Boody et al., "Progress In Nuclear-Pumped Lasers," in *Radiation Energy Conversion In Space*, (AIAA, New York, 1978), pp. 379-410, suggests application of a plasma focus device as a pulsed neutron source. A laser-driven D-T pellet would provide a microexplosion to generate the fusion reaction.

None of the prior art references teach a continuous or long pulse fusion reaction as a neutron source. It is desirable to obtain a relatively long pulse or a continuous laser output for use in various applications. For example, such a source will provide a high-energy laser output for use in communication applications.

SUMMARY OF THE INVENTION

To achieve the foregoing and other objects, and in accordance with the purposes of the present invention, as embodied and broadly described herein, the apparatus of this invention may comprise a system for generating laser radiation from a high-energy neutron source. The neutron source is a tokamak fusion reactor generating a long pulse of high-energy neutrons and having a temperature and magnetic field effective to generate a neutron flux of at least $10^{15}$ neutrons/$cm^2 \cdot s$. Conversion means are provided adjacent the fusion reactor at a location operable for converting the high-energy neutrons to an energy source with an intensity and energy effective to excite a preselected lasing medium. A lasing medium is spaced about and responsive to the energy source to generate a population inversion effective to support laser oscillations for generating output radiation.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
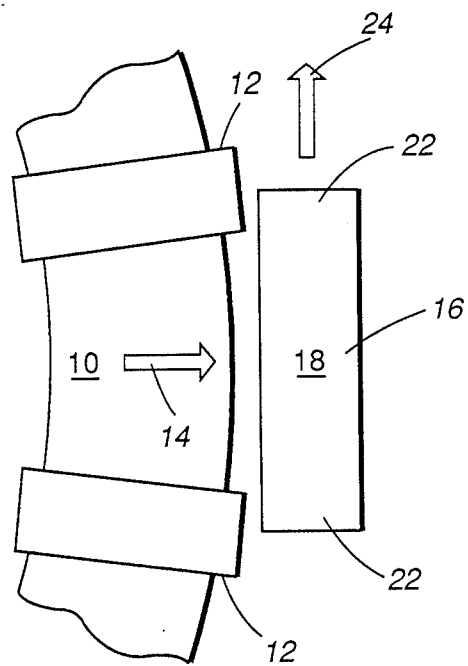
FIG. 1 is a conceptual representation of a fusion-pumped laser using a lasing medium having a dispersed material for interacting with fusion neutrons.

As discussed in the prior art, a variety of media may be used to generate a laser output when excited by a neutron flux at various threshold values. Table A is illustrative of laser media which have produced outputs from pumping reactions arising from interactions with a thermal neutron flux.

In a preferred embodiment of the present invention a tokamak is provided for a fusion neutron source. A tokamak design can be provided which obtains the required neutron density with a neutron pulse having a relatively long pulse duration of high-energy (14.6 MeV) neutrons. The pulse length can be lengthened by increasing the size of the power supply, a routine design matter involving primarily cost considerations with respect to the power supply.

The preferred tokamak design is selected to provide a plasma temperature effective to generate sufficient neutrons. The fusion plasma is then subjected to a high magnetic field to provide the requisite plasma density. The plasma energy and the resulting neutron flux density can be further increased by well-known techniques as subjecting the plasma to a neutral particle beam and the use of solid D or T pellets to the plasma.

TABLE A

| Laser | | Pumping Reaction | Wavelength | Thermal Flux Threshold (n/cm²-sec) | Length of Laser Output | Peak Laser Power |
|---|---|---|---|---|---|---|
| He—Hg | 18,19 | $^{10}B(n,\alpha)^7Li$ | 6150Å | $\sim 1 \times 10^{16}$ Thresh $10^{14}$ | 400 μsec | $\sim 1$ mW |
| CO | 6 | $^{235}U(n,f)ff$ | 9.1-5.6μ | $-5 \times 10^{16}$ | 50 μsec | $>2$ W |
| He—Xe | 14 | $^{235}U(n,f)ff$ | 3.5μ | $\sim 3 \times 10^{15}$ | 150 μsec | $>10$ mW |
| Ne—N₂ | 15,16 | $^{235}U(n,f)ff$ and $^{10}B(n,\alpha)^7Li$ | 8629Å and 9393Å | $\sim 1 \times 10^{15}$ | 6 msec | $\sim 2$ mW |
| $^3$He—Ar | 17* | $^3He(n,p)T$ | 1.79μ | $\sim 2 \times 10^{16}$ | 365 μsec | $\sim 50$ mW |

*These workers also indicate (unpublished reports) lasing in the 1-2.5μ range for He mixtures with Kr, Xe, and Ne.

A suitable set of tokamak parameters is as follows:

| Major radius | 2.5 meters |
|---|---|
| Minor radius | .85 meters |
| Elongation factor | 1.3 |
| $B_T$ (force field) | 12 T |
| $I_p$ (current) | 10 MA |
| $T_i$ (temperature) | 20 keV |
| n (density) | $5 \times 10^{14}$ cm$^{-3}$ |
| $\tau_E$ (confinement) | 0.5 sec |
| Neutron flux F | $10^{15}$ n/cm² sec |
| Pulse duration | 10 sec. |

Mechanical factors include the major radius (radius of the torus forming the tokamak), minor radius (radius of the plasma tube), and elongation factor (deviation of the plasma tube from a circle). A magnetic field of 12 T is provided to increase the plasma density and hence the neutron flux density to provide a threshold density for the lasing reaction.

It will be appreciated that the above operational design parameters, such as temperature ($T_i$), plasma density (n) and neutron flux (F), have been individually provided in operational or designed tokamaks. Plasma temperatures of 20 keV have been reported for the TFTR, "Princeton Tokamak Reaches Record Plasma Ion Temperature," Phys. Today, 19–21 (November 1986). A pulse duration of 10 s is provided as an illustrative pulse duration which has been obtained in operating tokamaks.

By way of comparison, the operating parameters of existing tokamaks, JET and TFTR, and a next generation design tokamak, CIT, are set out in Table B.

TABLE B

| | Comparison of key plasma parameters. | | | |
|---|---|---|---|---|
| | | Device | | |
| Parameter | JET | | TFTR | CIT (Design) |
| R(m) | 2.9 | 2.5 | 2.5 | 1.75 |
| a(m) | 1.25 | .85 | .85 | .55 |
| $B_T$(T) | 3 | 5 | 5 | 10 |
| $n_o(O)$cm$^{-3}$ | $5 \times 10^{13}$ | $10^{13}$ | $10^{14}$ | $5 \times 10^{14}$ |
| $I_P$(MA) | 5 | 1 | 2.5 | 9 |
| $T_i(O)$ keV | 5 | .30 | 4 | 10 |
| $\tau_E$(sec) | 1 | .18 | .4 | .5 |
| $n_e\tau_E$(sec · cm$^{-3}$) | $5 \times 10^{13}$ | $1.8 \times 10^{12}$ | $4 \times 10^{13}$ | $2.5 \times 10^{14}$ |
| $S\left(\dfrac{n}{\sec}\right)$ | $10^{17}$ | $1.2 \times 10^{18}$ | $5 \times 10^{17}$ | $1.5 \times 10^{20}$ |
| $F\left(\dfrac{n}{cm^2 \sec}\right)$ | $5 \times 10^{11}$ | $1.5 \times 10^{12}$ | $6 \times 10^{11}$ | $9 \times 10^{14}$ |

TABLE B-continued

| | Comparison of key plasma parameters. | | | |
|---|---|---|---|---|
| | | Device | | |
| Parameter | JET | | TFTR | CIT (Design) |
| *D-T Equivalent Pulse Length | 19 sec | 1–2 sec | | 2–4 sec |

It has also been demonstrated by the Alcator tokamak at MIT that a high magnetic field acts to increase the plasma density from the tokamak. Deuterium pellets have been injected into the Alcator C tokamak to increase plasma density, Greenwald et al., "Energy Confinement Of High-Density Pellet-Fueled Plasmas In The Alcator C Tokamak," Phys. Rev. Lett. 53, No. 4, 352–355, (July 23, 1984), incorporated herein by reference. The use of neutral particle beam injection to maximize plasma temperatures has also been demonstrated. A substantial performance increase of the Tokamak Fusion Test Reactor (TFTR) is shown in Hendel et al., "Measurement of Record Fusion Neutron Yields In the TFTR," submitted at the annual meeting of the American Nuclear Society, (June 7–11, 1987), incorporated herein by reference.

Referring now to FIG. 1, there is shown a fusion-pumped laser in conceptual form. Tokamak 10 is provided with magnetic coils 12 for confining the plasma. Coils 12 are configured to enable fusion neutron flux 14 to escape tokamak 10 with little moderation such that fusion neutrons 14 are provided at 14.6 MeV external to tokamak 10. Laser 16 is located adjacent tokamak 10 to receive neutron flux 14 within lasing medium 18.

As shown in FIG. 1, lasing medium 18 is selected to use the high-energy fusion neutron flux within the volume of lasing medium 18. A suitable lasing medium is described in U.S. Pat. No. 4,160,956. A high-volume lasing medium may be used with the high-energy fusion neutrons to provide a greatly increased laser output arising from the increased mean free path length of the high-energy neutrons. Laser 16 is conventionally provided with mirrors 22 to provide the desired amplification and enable laser output 24 from laser 16.

Figure 2:
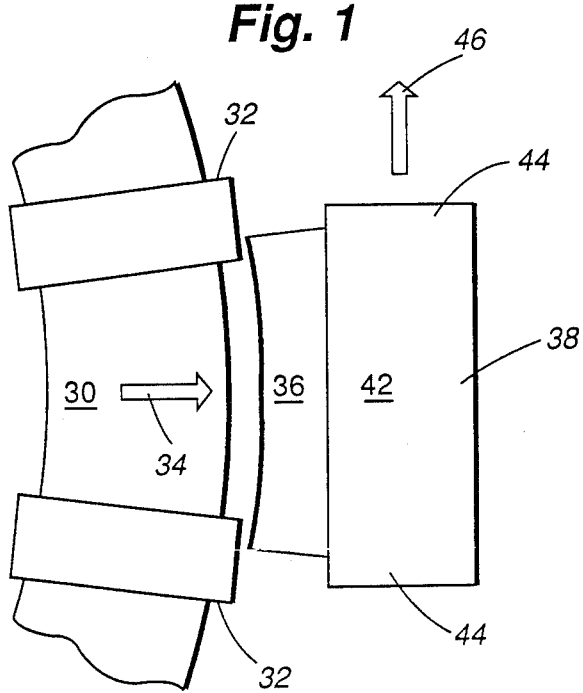
FIG. 2 is a conceptual representation of a fusion-pumped laser having an interactive medium dispersed between the fusion source and the laser medium.

Another embodiment of a fusion-pump laser is conceptually shown in FIG. 2. Tokamak 30 is provided with magnetic coils 32 configured to enable fusion neutron flux 34 to escape from tokamak 30. As shown in FIGS. 1 and 2, magnetic coils 12 and 32 may be simply spaced apart or the coils may be wound to provide a relatively thin coil on the exterior of tokamak 30.

A blanket 36 of a moderator or an enhancement material is provided adjacent tokamak 30 to receive the high-energy fusion reaction neutron flux 34. Blanket 36 is provided from $^{235}$U, $^{10}$B, or $^3$He, to provide fission fragment and other high-energy radiation for exciting a laser medium. The long mean free path length of the high-energy neutrons enables a large volume of moderator material to be provided with a resulting particle density for exciting the lasing medium for a high-energy output.

Laser 38 is provided adjacent moderator 36 with a lasing medium having the desired output. Table A, above, is illustrative of laser output parameters available from selected lasing media. Laser 38 is again provided with conventional mirrors 44 to amplify the laser and enable laser output 46.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for generating laser radiation, comprising:
   tokamak fusion means for generating a long pulse of high-energy neutrons and having a temperature and magnetic field effective to generate a neutron flux of at least $10^{15}$ neutrons/cm$^2$·s;
   conversion means adjacent said fusion means operable for converting said high-energy neutrons to an energy source with an intensity and energy effective to excite a preselected lasing medium; and
   said lasing medium responsive to said energy source to generate a population inversion effective to support laser oscillations for generating output radiation.

2. Apparatus according to claim 1, wherein said conversion means includes a blanket of fissionable material selected from the group consisting of $^{235}$U, $^3$He, and $^{10}$B.

3. Apparatus according to claim 1, wherein said conversion means includes a fissionable material dispersed in said lasing medium.

4. Apparatus according to claim 1, wherein said tokamak has magnetic field coils effective for said neutron flux to penetrate said conversion means.

* * * * *